UNITED STATES PATENT OFFICE.

HENRY CROOKES AND LEWIS STROUD, OF LONDON, ENGLAND.

PRODUCTION OF METAL COLLOIDS.

1,116,247. Specification of Letters Patent. Patented Nov. 3, 1914.

No Drawing. Application filed December 8, 1913. Serial No. 805,444.

*To all whom it may concern:*

Be it known that we, HENRY CROOKES and LEWIS STROUD, residing in London, England, have invented certain new and useful Improvements in the Production of Metal Colloids, of which the following is a specification.

In producing metal colloids from a dilute mixture obtained in a known manner by dissolving some organic body such as peptone in distilled water with an addition of common salt and cooling the mixture after boiling for the purpose of proper dissolution according to the specification of our Letters Patent No. 1059841, it has already been proposed to add to the mixture a very dilute solution of salts of metals.

We have now found that in some cases metallic colloids having a very marked "Brownian" movement visible under the ultra-microscope, may be obtained solely by a reducing action between the peptone and the salt of metal used in the process. The condition, however, in having the metal salt employed in a very dilute solution of about the order of 1 part of metal in 1000 of solution is also essential in the present process. In this process, however, we dispense with the use of common salt. For example, according to this invention we produce silver colloid by adding a dilute solution of silver nitrate to a solution of peptone of the strength and proportions set out in the specification of the Letters Patent above referred to, and to the mixture we add about 0.1% phenol, it being essential during the mixing of the two solutions to pour the solution of the silver salt into the solution of peptone and not vice versa.

In order to produce iron colloid according to this invention, we take a very dilute solution of perchlorid of iron, about the same order of 1 in 1000 and add this solution to a solution of peptone (about 150 grains in one quart of water), a small percentage of phenol (0.1%) being again added to the mixture.

The addition of phenol to metal colloids has the object to render the mixture permanently stable, experience having shown that some metal colloids under certain conditions not yet fully understood have the tendency to break down after a certain period and we have found that if a small percentage of phenol is added such tendencies are counteracted and the colloidal solution is rendered substantially permanent.

It is noted that while we have claimed nitrate of silver we regard as equivalents protonitrate of mercury and perchlorid of iron.

What we claim and desire to secure by Letters Patent is:

1. A process of producing metal colloids by mixing a solution of peptone with a very dilute solution of nitrate of silver.

2. A process of producing metal colloids by mixing a solution of peptone with a very dilute solution of nitrate of silver, and then adding to the mixture a small percentage of phenol to render the colloidal solution stable.

In testimony whereof we have affixed our signatures in presence of two witnesses.

HENRY CROOKES.
LEWIS STROUD.

Witnesses:
H. D. JAMESON,
H. V. PUMFREY.